United States Patent
Valiquette

(10) Patent No.: US 6,247,269 B1
(45) Date of Patent: Jun. 19, 2001

(54) SYSTEM FOR PLANT GROWING

(76) Inventor: Marc Andre Valiquette, 7644, Christophe-Colomb, Bureau 8, Montreal, Quebec (CA), H2R 2S7

(*) Notice: Subject to any disclaimer, the term of this patent is extended or adjusted under 35 U.S.C. 154(b) by 0 days.

(21) Appl. No.: 08/735,068

(22) Filed: Oct. 18, 1996

Related U.S. Application Data

(63) Continuation-in-part of application No. 08/424,898, filed on Apr. 19, 1995, now abandoned.

(51) Int. Cl.$^7$ .................................................... A01G 25/00
(52) U.S. Cl. ................................................................. 47/81
(58) Field of Search .................................. 47/79, 70, 81

(56) References Cited

U.S. PATENT DOCUMENTS

| | | | |
|---|---|---|---|
| 2,084,005 | * 6/1937 | Richards | 47/48.5 |
| 3,550,319 | * 12/1970 | Gaines, Jr. | 47/48.5 |
| 3,576,088 | * 4/1971 | Arca | 47/81 |
| 3,603,034 | * 9/1971 | Maxwell-Stewart | 47/48.5 |
| 3,857,804 | 12/1974 | Glatti et al. | 47/58.1 |
| 3,863,387 | 2/1975 | Webster et al. | 47/28.1 |
| 3,975,860 | * 8/1976 | Harned et al. | 47/79 |
| 4,051,626 | 10/1977 | Trumley et al. | 47/17 |
| 4,083,147 | 4/1978 | Garrick | 47/80 |
| 4,098,021 | 7/1978 | Gruber | 47/66 |
| 4,160,342 | 7/1979 | Dryer | 47/80 |
| 4,271,630 | * 6/1981 | Zeltner et al. | 47/79 |
| 4,306,542 | 12/1981 | Reinert | 47/58.1 |
| 4,329,812 | 5/1982 | Carlisle | 47/59 |
| 4,337,594 | 7/1982 | Hanacek et al. | 47/1.1 |
| 4,345,403 | 8/1982 | Giovannetti | 47/1.1 |
| 4,569,153 | 2/1986 | Szilagyi | 47/58.1 |
| 4,812,339 | 3/1989 | Shibata et al. | 428/15 |
| 4,824,572 | 4/1989 | Scott | 47/62 |
| 4,829,707 | 5/1989 | Koffler et al. | 47/26 |
| 4,903,432 | 2/1990 | Velagaleti et al. | 47/81 |
| 4,941,572 | 7/1990 | Harris | 47/84 |
| 4,962,613 | * 10/1990 | Nalbandian | 47/79 |
| 5,016,388 | 5/1991 | Burress et al. | 47/23 |
| 5,042,197 | * 8/1991 | Pope | 47/79 |
| 5,064,308 | 11/1991 | Almond et al. | 47/48.5 |
| 5,115,915 | 5/1992 | Harris | 47/84 |
| 5,138,792 | 8/1992 | Allingham | 47/9 |
| 5,209,015 | 5/1993 | DeFilippi | 47/79 |
| 5,303,504 | 4/1994 | Buzzell | 47/52 |
| 5,393,312 | 2/1995 | Ogawa et al. | 47/58.1 |
| 5,393,426 | 2/1995 | Raskin et al. | 47/58.1 |
| 5,568,701 | 10/1996 | Haigler | 47/48.5 |
| 5,787,641 | 8/1998 | Watkins | 47/73 |
| 5,806,242 | 8/1998 | Park | 47/81 |
| 5,876,484 | 3/1999 | Raskin et al. | 47/58.1 |
| 5,972,689 | 10/1999 | Cook et al. | 47/57.6 |
| 6,018,909 | 2/2000 | Potts | 47/58.1 |

FOREIGN PATENT DOCUMENTS

| | | | |
|---|---|---|---|
| 008291 | * 9/1983 | (EP) | 47/70 |
| 2363278 | * 5/1978 | (FR) | 47/81 |
| 2618297 | * 1/1989 | (FR) | 47/79 |
| 403460 | * 12/1933 | (GB) | 47/79 |

* cited by examiner

Primary Examiner—Charles T. Jordan
Assistant Examiner—Francis T. Palo
(74) Attorney, Agent, or Firm—Eric Fincham

(57) ABSTRACT

There is provided a plant container wherein there is an insert adapted to be placed within the container, the insert having a soil supporting member spaced from the bottom of the container, the soil supporting member having a plurality of apertures formed therein. There is at least a first liquid outlet from the container which is located between the bottom wall and the soil supporting member and also provided are gas communication means to permit gaseous communication to a space intermediate the liquid outlet and the soil supporting member.

16 Claims, 4 Drawing Sheets

SYSTEM FOR PLANT GROWING

The present application is a continuation-in-part of application Ser. No. 08/424,898 filed Apr. 19, 1995, now abandoned.

BACKGROUND OF THE INVENTION

The present invention relates to a plant growing system and to plant container systems and to methods for growing plants.

Container planting is well known and widely practiced. Its uses vary from locations wherein other types of gardening are impossible such as in urban settings such as high rise buildings to its use for decorative and aesthetic purposes such as flower boxes. Container gardening is also widely practiced for purposes of space utilization and design such as for patios, solariums and the like.

In the field of container planting or gardening, different concepts have developed over the years to provide an integrated approach to plant growth. These systems include the use of hydroculture, hydroponics, artificial growing media, natural potting soil, etc.

In hydroculture systems, the entire root mass of a plant is completely immersed in stagnant nutrient water and consequently only a few plants are able to adapt to such conditions.

In hydroponic systems, the entire root mass of a plant is completely immersed in running nutrient water and the system utilizes a pump irrigation system. While some plants of commercial value can be grown with this method, other plants such as roses do not thrive under hydroponic cultivation methods.

Artificial growing media have proved themselves to be valuable alternatives to conventional potting soil. This type of system is useful for those plants which have evolved their root system mainly for anchoring purposes in media other than soil—i.e. orchids and other epiphyte plants. Planting media can include mixtures of bark, peat moss, Spanish moss, sphagnum moss, fertilizer, vermiculite, etc.

Systems of containers using natural potting soil are well known and widely used as they prove themselves able to sustain the life of substantially all plants for a given period of time. There have been many proposals in the art to provide improvements for such natural soil containers; such improvements have included self watering devices such as wicks or special bottom reservoirs. While these systems provide the roots with direct contact with soil particles and microorganisms, the limitations of all these containers is that the water reservoir is generally not large enough or available enough for the growing needs of all plants. Also, another fundamental limitation is that the roots of all plants cultivated in these containers end up being incarcerated inside of a compact potting soil ball. Roots do not further expand outside of the said ball without being damaged as they can escape only through the drainage holes that have not been designed for this very purpose. The growing roots that reach the bottom of all plant containers grow in a pattern known as spiralization: the roots grow in a circular pattern that represents a waste of energy by the plant. The roots become engaged in a vicious circle of unnecessary growth in order to find the necessary space for water seeking and uptake. This provokes the suffocation of root tissue, the complete arrest of growth by the plant, and the start of dormancy. People who are familiar with the art of plant husbandry know that it is time to change the pot for a larger one, a technique known as repotting, otherwise, plants lose their leaves and may even die.

SUMMARY OF THE INVENTION

It is an object of the present invention to provide a novel container for plants wherein an integrated approach to plant growth is provided.

It is another object of the present invention to provide a novel gardening system which helps to maximize root and plant growth for a wide variety of plants while preventing the process of spiralization of root tissue.

It is a further object of the present invention to provide a horticulture method which is reliable, easy to use and suitable for a wide variety of plants.

According to one aspect of the present invention, there is provided a plant container comprising a container having a bottom wall and a side wall extending upwardly therefrom, a soil support member spaced from the bottom wall to define a space between the bottom wall and the soil support member, at least one wall extending downwardly from the soil support member to thereby define a cavity, a plurality of apertures in the wall, an air inlet to the space, the air inlet communicating with an upper portion of the space, a gas outlet from the space, the gas outlet being spaced from and located below the gas inlet means such that air entering the space from the air inlet will pass through a substantial portion of the space before exiting the gas outlet.

In a further aspect of the present invention, there is provided a container having a bottom wall and a side wall extending upwardly therefrom, a soil support member spaced from the bottom wall to define a space between the bottom wall and the soil support member, a liquid outlet extending between the space and exterior of the container, the soil support member having at least one downwardly extending wall to define a cavity, a plurality of apertures in the downwardly extending portion, the downwardly extending portion and the apertures extending below the liquid outlet.

In a still further aspect of the present invention, there is provided a horticulture method comprising the steps of supplying a container having a bottom wall and a side wall extending upwardly therefrom and a soil support member spaced from the bottom wall to define a space between the bottom wall and the soil support member, and at least one downwardly extending portion from the soil support member to define a cavity, placing a non soil medium in the cavity, placing a soil on the soil support member on top of the non soil medium, maintaining a liquid level within the space such that the liquid contacts the non soil medium, and maintaining an air space between the soil and the liquid while permitting a slow air exchange between the air space to exterior of the container.

As is well known, 50% of the total biomass of many plants used for ornamental or agricultural purposes is underground. One role of the root zone is to provide support and anchorage for the plant canopy which in turn transforms the sunlight into chemical energy through photosynthesis. Roots are also required to provide the plant with water and nutrients; some of the nutrients and oligo-elements found in clay are not directly available for the roots. Soil microorganisms have the ability to convert unavailable nutrients into easier forms for assimilation by the roots. The root systems of plants have evolved complex interactions with the soil microorganisms in order to assist the process of nutrient conversion and uptake. Nutrient assimilation is usually performed by roots that are located in the first few inches of topsoil and these roots have evolved complex symbiotic interactions with microorganisms found in the top soil. Nutrient assimilation is a process that happens simultaneously with oxygen uptake and carbon dioxide evacuation from healthy root cells.

In one aspect of the present invention, the present system is characterized by stratification of three different zones or regions which are incorporated in a container system. The system permits any plant to reach maturity by giving special attention to the specific needs of its radicular system. It provides an environment for those roots that specialize in the function of water seek and uptake. The system attempts to mimic that which is commonly found in nature. The system also provides a transition region between the soil and the water with a balance between air and water supplies.

An environment is provided such that an air supply may provide the expanding aquiferous root population with intermittent direct contact with either water or moist cool air. The cool air is gradually renewed at all times in order to provide the same roots with a constant supply of oxygen and to provide soil microorganisms with a constant supply of nitrogen. The roots are also provided with a constant supply of cool water vapor so that they are protected from desiccation.

An aerated labyrinth is provided at the bottom of the container and its shape or volume changes with the position of the water level above the water table in the container. Carbon dioxide originating from the metabolic activity of plant roots and soil microorganisms is evacuated by specific openings located immediately above the maximal position of the water table. These openings also evacuate all excess waters so that a perpetual air space is maintained in the labyrinth.

Roots that are specialized in either mineral nutrient uptake or interactions with the microbial flora of the planting medium are allowed to thrive in the soil zone. Capillary action permits these roots to thrive in a fresh and moist planting medium wherever water is present in the reservoir. Roots specialized in water uptake are located in the water reservoir.

The container of the present invention may be formed in any number of different configurations. Thus, it may be a conventional rectangular configuration or if desired, it could be formed into other configurations for aesthetic purposes. The functioning of the container, however, irrespective of the shape, is the same.

In one particular embodiment of the invention, the container is adapted to be divided into different sections wherein each section may accommodate different types of plants. The plants may all have the same growing requirements or alternatively, different growing conditions may be provided for varying plant requirements.

A feature of the present invention is the use of a member which is adapted to support the soil in a spaced relationship from the bottom of the container. The bottom of the container is designed to provide an air zone and a liquid zone in the bottom thereof. As such, the base of the container will preferably be of a waterproof nature.

As mentioned, the member is adapted to support the soil in a spaced relationship from the bottom of the container. As such, in one embodiment, there may be provided support means on the walls of the container for supporting the member in such a relationship. Preferably, the member includes one or more cavities of any shape and form therein and which cavities extend downwardly into an area where water is contained. These cavities are adapted to be filled with a non soil medium as will be discussed in greater detail hereinbelow.

One may use a single member or a plurality of such members. The members may be of a different size and thus allow for different types of plants. The members provide for the division of the container into at least three different zones. The members will contain a plurality of apertures to permit passages of roots therethrough and the arrangement and sizing of the apertures is such that preferably between 25% to 85% of the area of the wall defining the downwardly extending cavities is apertured with the apertures having a minimum dimension of between 2 and 6 mm and more preferably between 4 and 5 mm.

There are preferably provided various fluid communication means between the space having the liquid and gas zones and the exterior of the container. Preferably, there is provided at least one communication means for liquid and one communication means for gas. Thus, when the plants are growing, a lower portion of the space between the soil support member and the container bottom is adapted to contain water with an upper portion of the space adapted to permanently provide air access. For this reason, the water outlet is situated such that when the water reaches a certain level (below the level of the soil on the soil support member) it will automatically overflow such that the air zone is maintained and the water which overflows can be kept aside for use in another container for the next watering, so that no minerals or micro-organisms from the soil should ever be lost from the container or network of containers. Such a liquid outlet may be incorporated by a conduit extending through either the bottom wall or a side wall.

There is also provided a gaseous communication means such that air may freely flow (as discussed hereinbelow) in the space or gas zone between the soil support member and the water. Again, a suitable conduit may be provided which extends upwardly through the soil or alternatively may extend through a side or end wall of the container. It is important that the air should not allow aquiferous root desiccation while still providing all the necessary oxygen that the same roots need for optimal water uptake. The system should allow slow air circulation and provide proper root tissue health. Thus, it is important to carefully select the size and position of the aeration opening so that gradual airflow can be allowed to the space between the soil and the water. The air space should communicate only with the outside air through openings of a chimney to provide gradual air communication and exchange with the outside atmosphere. In this respect, the soil, roots and water interact with the air in a different way.

Once the atmospheric air penetrates the air space, it finds itself to be in a humid environment because of the presence of a relatively large water table. The air will then saturate itself with water vapor; the absorption of the water vapor will cause it to cool down since the process is energy absorbent. The cooling down of the air is accompanied by a slight contraction of the gases to increase its density so that it can escape from a lower chimney or exit carrying with it other dense gases such as carbon dioxide. This in turn creates a partial vacuum which will bring in the fresh air from the upper chimney and which fresh air is rich in oxygen but poor in carbon dioxide and water vapor. Thus, there is set up a perpetual air circulation pattern and in this respect, the chimneys or gas inlet/outlet apertures must be sized to ensure the gas distribution as evenly as possible with the most aeration efficiency without creating a flow which would desiccate the exposed aquiferous roots as the water level diminishes.

In a preferred embodiment of the invention, there is provided a second outlet which is situated proximate the bottom wall of the container. This second liquid outlet can serve two functions. In a first role, it can provide liquid communication between adjacent containers when a plurality of such containers are employed. Secondly, it can serve as a liquid outlet during the initial stages of plant growth when a lesser amount of water may be desired in the bottom of the container. During the later stages of plant growth, this second liquid outlet can be closed to allow water retention in the space between the soil support member and the bottom wall of the container.

The container of the present invention is intended to be suitable for growing a number of plants and many of which such plants need support—i.e. tomatos, etc. To this end, there may be provided a support arrangement which utilizes a two point support. A first point of support is provided by the insert in the container while there may be an upper support member which extends between container walls and to which the plant support member is secured.

The system of the present invention includes an arrangement wherein the non soil medium vermiculite, or any particulated foam of similar properties, is utilized so as to be in contact with the water in the container and on top of which soil is placed.

This arrangement provides a so called radication interface wherein the geometry and composition is designed to allow an optimal balance between the soil, air, and water for the ever expanding aquiferous roots of the plants. Thus, the radication interface allows root growth and expansion outside of the physical boundaries of the interface and expressly allows direct contact of the entire aquiferous root tissue with the water. The inert material can take many forms including a particulate form or even a woven fiber form. Desirably, it is porous, non toxic, inert hydrophilic material. Vermiculite is the interface medium of first choice.

The provision of the non soil medium between the apertures and the bottom of the container allows for moisture to enter the soil by capillary action when roots are not mature enough for water uptake from the bottom of the container.

In a preferred embodiment, vermiculite particles are used as the non soil medium due to their ability to retain water while maintaining adequate air spaces necessary for proper root and soil aeration. It would be particularly preferred to utilize a mixture of equal amounts of medium sized and coarse sized vermiculite particles.

The material of which the container is formed may be any suitable. Thus, one could employ various woods, plastics, ceramics, metals, etc. Desirably, those portions which are continuously in contact with water such as a plastic or styrofoam.

The containers may be linked together either in a vertical or horizontal manner or combinations thereof.

In a further embodiment of the above, the soil support members comprise removable inserts which could be moved from one container to another. In such an embodiment, it would be possible to purchase plants which have already been started in one of the inserts and be able to place them in another container. To this end, the insert may be designed so as to be removable.

Having thus generally described the invention, reference will be made to the accompanying drawings illustrating an embodiment thereof, in which:

BRIEF DESCRIPTION OF THE PREFERRED EMBODIMENTS

Figure 1:
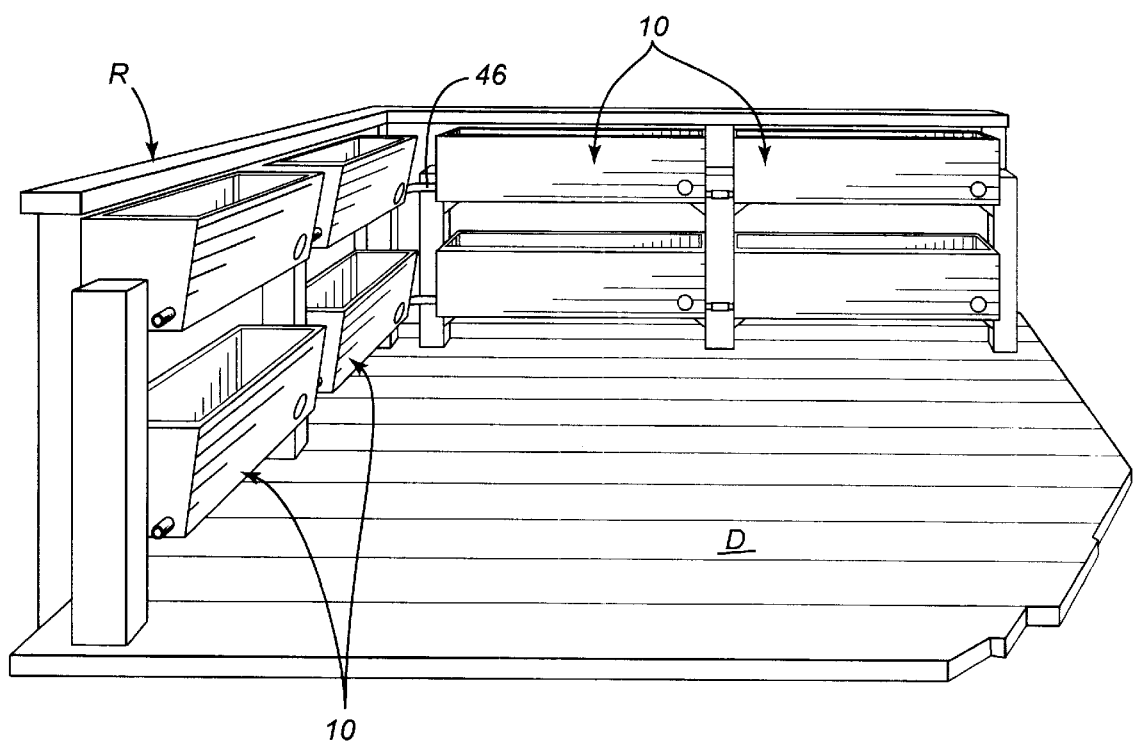
FIG. 1 is a perspective view of a plurality of containers in an interconnected system.

Referring to the drawings in greater detail and by reference characters thereto, there is illustrated a container according to the present invention and which container is generally designated by reference numeral 10. Container 10, in the illustrated embodiment is of a generally rectangular configuration and has a bottom wall 12, a pair of opposed side walls 14 and 16, and opposed end walls 18 and 20. Mounted on the interior surface of side walls 14 and 16 are side support members 22 and 24 (FIGS. 5 and 6) respectively. Side support members 22 and 24 extend longitudinally along the inner surface of side walls 14 and 16.

A plurality of inserts 26, are adapted to be placed in the interior of container 10. Each of the inserts is similar and thus, only one will be described in detail herein.

Insert 26 includes a planar top wall 28, a lower surface 30 (FIG. 5) thereof being adapted to seat on side support members 22 and 24. Insert 26 also includes a pair of cavities 32 and 34; each of cavities 32 and 34 is substantially identical and only one will be described herein.

Cavity 32 is defined by a pair of opposed side walls 36 and 38 and opposed end walls 40 and 42. A bottom wall 45 is angled between side walls 36 and 38. In this respect, it will be noticed that side wall 36 extends downwardly a distance greater than side wall 38.

A plurality of apertures 44 are provided in top wall 28 as well as in end walls 40, 42; side walls 36 and 38; and bottom wall 45 for reasons which will become apparent hereinbelow.

Figure 4:
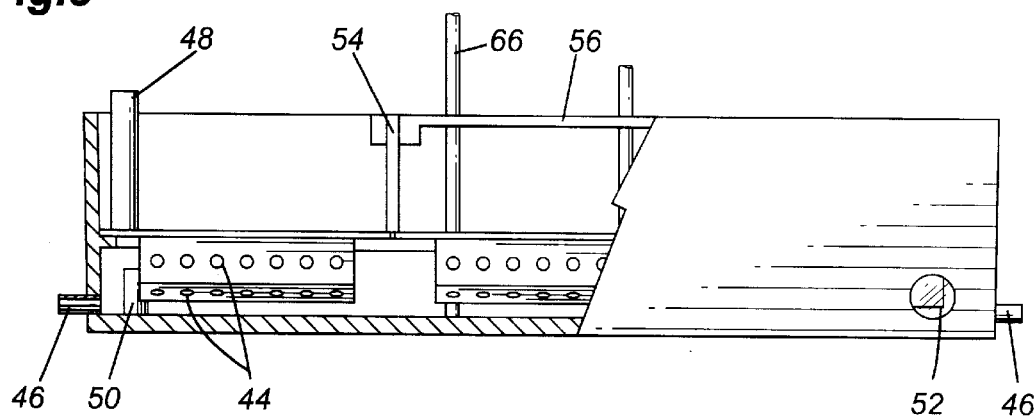
FIG. 4 is a side elevational view, partially in cutaway, of the container.

Extending through end wall 18 is a conduit 46. A similar conduit may extend through end wall 20 (FIG. 4). Conduit 46 provides fluid communication between the interior of container 10 and the exterior thereof. In this respect, conduit 46 is spaced upwardly from bottom wall 12.

An upper conduit 48 extends from planar top wall 28 upwardly to near the top of wall 14, again for reasons which will become apparent hereinbelow. In this respect, it will be noted that conduit 48 is placed such that fluid communication is provided with one or more of apertures 44.

A lower conduit 50 extends through bottom wall 12 and also provides fluid communication between the interior and exterior. In this respect, it will be noted that the upper end of conduit 50 is spaced below planar upper wall 28 and above conduit 46.

Figure 2:
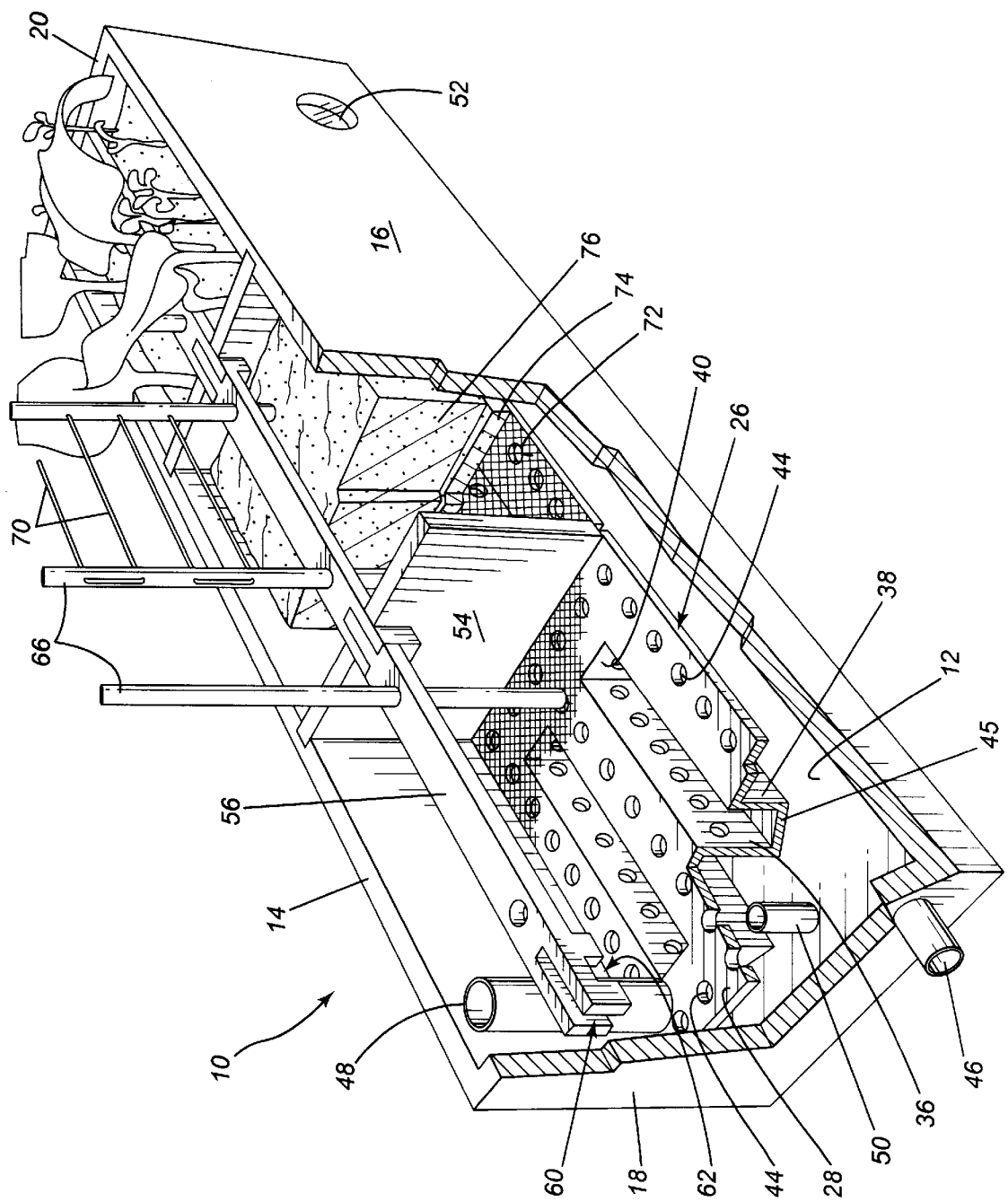
FIG. 2 is a perspective view, partially in cutaway, of a container according to the present invention.
Figure 3:
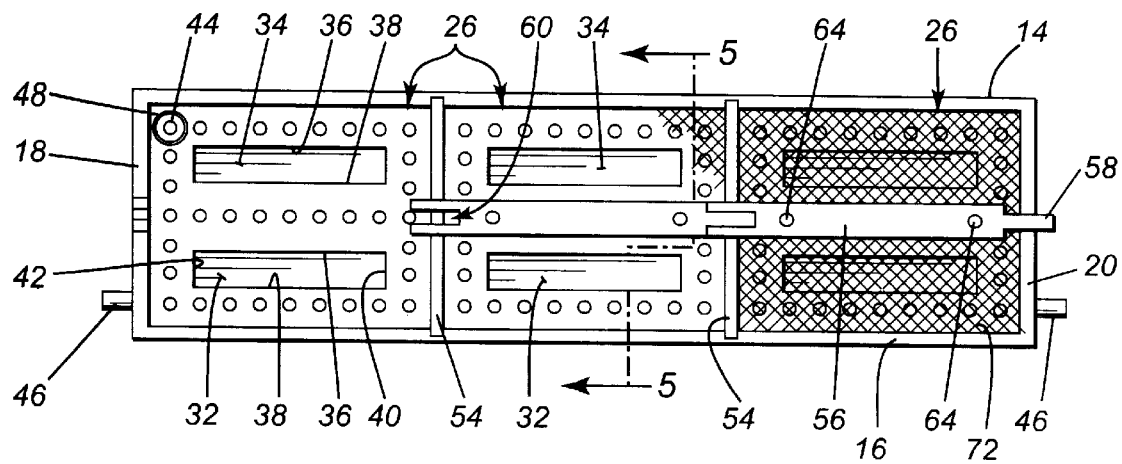
FIG. 3 is a top plan view thereof.

As may be seen in FIG. 2, a transparent insert 52 is provided in side wall 16. Transparent insert 52 is preferably located proximate the bottom of the container—i.e. in the space below top wall 28 of insert 26.

In the illustrated embodiment, the container also includes a plurality of transverse dividers indicated by reference numeral 54. Transverse dividers 54 extend between side walls 14 and 16 and are supported by top wall 28 of inserts 26.

A plurality of upper support members 56 are provided with each upper support member 56 extending between a pair of transverse dividers 54 or a transverse divider 54 and an end wall as applicable.

Each upper support member 56 includes a tenon 58 and a mortise 60 at an opposed end thereof. The end containing mortise 60 includes a groove 62 formed in the bottom thereof such that upper support member 56 will seat on transverse divider 54 or end wall 18, as appropriate.

Upper support members 56 also have one or more apertures 64 formed therein. Apertures 64 are sized to receive vertically extending plant supports 66. In this respect, it will be noted that supports 66 extend through apertures 64 and also are adapted to seat in one of the apertures 44 provided in top wall 28.

Supports 66 also include apertures through which one or more strings 70 may extend.

Figure 5:
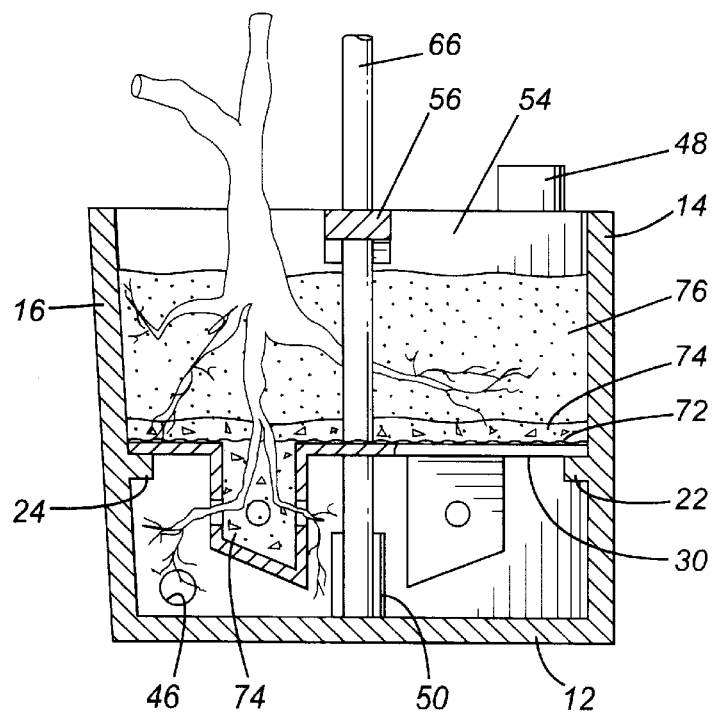
FIG. 5 is a sectional view taken along the lines 5—5 of FIG. 4.

As shown in FIGS. 4 and 5, a screen 72 may be provided on the upper surface of top wall 28 for reasons which will become apparent hereinbelow.

In operation, inserts 26 are placed inside the container with top wall 28 being supported by side support members 22 and 24. The arrangement is such that after being placed in the container, the bottom wall 45 of cavities 32 and 34 is spaced from bottom wall 12 of container 10. A soil-less medium 74 such a vermiculite is then placed within cavities 32 and 34 and screen 72 placed thereover. A further layer of non soil medium 74 may then be placed on top of screen 72 (see FIG. 6).

Subsequently, soil 76 is placed on top of non soil medium 74.

Initially, plants or seeds are placed in soil 76 with a minimum amount of water being provided to the bottom of container 10. Subsequently, after roots have grown sufficiently to pass through apertures 44 such that they are visible through transparent insert 52, conduit 46 would have a plug placed therein and water would be permitted to fill the bottom of the container up to the level of the top of conduit 50. Any excess water would, of course, flow through conduit 50. In this respect, it is noted that conduit 50 is below the level of top wall 28.

In growth, different types of roots will form and which roots will spread throughout soil 76. Certain roots, are water seeking and will extend through the non-soil medium 74 in order to exit the lower member through its apertures and down into the water in the bottom of container 10. Still other roots will form and occupy the space between the top of the water in the container and the top wall 28—i.e. in the portion wherein air is provided. Roots specialized for seeking nutrients will grow in the planting medium.

It will be seen from the above that there is provided a container which provides both soil with its nutrients, an aqueous zone, and an air zone. Combinations of these various zones allow for the maximum development of the plant into a well balanced soil ecosystem contained in the planter.

The system also provides for maximum flexibility. Thus, with the use of transverse dividers 54, one can grow different plants having different requirements in the same container. As may be seen, the support members are extremely solid as they are supported at two different points.

As shown in FIG. 1, a plurality of the containers may be connected in a horizontal manner. Thus, in a typical arrangement on a depth D having railing R, a plurality of containers 10 are provided and suitably supported. Conduits 46 may be utilized for interconnecting the containers to provide for free passage of water from one container to another. If desired, vertical connections could also be employed.

Still further, it will be understood that conduits 46 could be used to direct any excess water to a container for reuse. Thus, in watering the plants in container 10, any nutrients leeched from the soil by the water as it passes therethrough will collect in the bottom and it would be desirable that any excess water be collected for such reuse.

It will also be understood that the bottom of the containers, could, if desired, have different forms such that one end of the container would have a greater depth of water than the other end. This would permit the placing of plants having different requirements in the same box. Thus, carried to the extreme, one could have, for example, tomato plants at one end of the container wherein the water reservoir is relatively deep while at the other end one could grow plants requiring arid conditions such as cacti.

Figure 6:
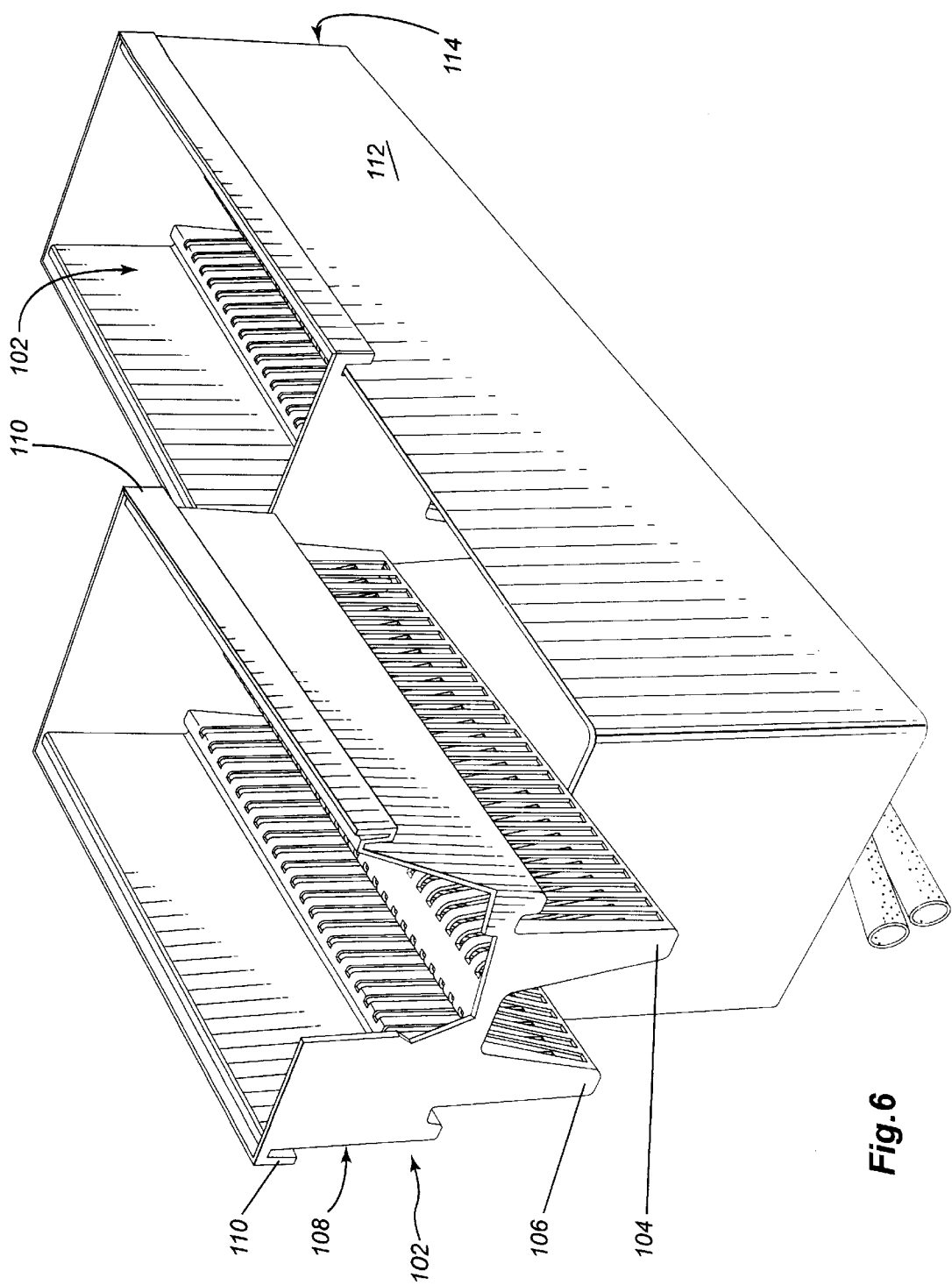
FIG. 6 is a perspective view of a modified embodiment of the system.

In the embodiment shown in FIG. 6, there is provided an insert 102 similar to that previously described. Insert 102 has a pair of downwardly extending recesses 104 and 106 which are formed integrally therewith. An upper portion 108 has a pair of support flanges 110 extending along the sides thereof. Support flanges 110 are adapted to engage side wall 112 of container 114. In this embodiment, inserts 102 could be interchangeable and could be moved from one container to another without any shock.

In the embodiment illustrated in FIGS. 1 to 5, it will be understood that various modifications may be made thereto. For example, transparent insert 52 may be extended to cover a greater area to provide visual access to the growing within the container. In one embodiment, the transported portion may be designed as a lens to enhance visibility. In a further embodiment, the lens could be coloured so as to allow one to see the root growth without promoting photosynthesis of any algae that could be present in the water reservoir. The use of a green coloured insert could be used to minimize algae growth.

It will be understood that the above described embodiments are for purposes of illustration only and that changes and modifications may be made thereto without departing from the spirit and scope of the invention.

I claim:

1. A plant container comprising a container having a bottom wall and a side wall extending upwardly therefrom, a soil support member spaced from said bottom wall to define a space between the bottom wall and said soil support member, at least one wall extending downwardly from said soil support member to thereby define a cavity, a plurality of apertures in said wall, said apertures having a minimum size of at least 2 mm to permit root growth therethrough, an air inlet to said space, said air inlet communicating with an upper portion of said space, a gas outlet from said space, said gas outlet being spaced from and located below said air inlet such that air entering said space from said air inlet will pass through a substantial portion of said space before exiting said gas outlet.

2. The plant container of claim 1 further including a transparent portion in said side wall, said transparent portion being of a green colour.

3. The plant container of claim 1 further including a plurality of said soil support members mounted within said container.

4. The plant container of claim 1 wherein said air inlet comprises a conduit communicating between an upper portion of said space and exterior of said container.

5. The plant container of claim 1 further including a liquid outlet from said space, said liquid outlet being located below said air inlet to said space.

6. The plant container of claim 5 wherein said liquid outlet communicates with a second plant container.

7. The plant container of claim 1 wherein said apertures formed in said wall extending downwardly from said soil support member have an area comprising at least 50% of the surface area of said wall.

8. The container of claim 1 wherein said inert non soil medium is vermiculite.

9. A container having a bottom wall and a side wall extending upwardly therefrom, a soil support member spaced from said bottom wall to define a space between said bottom wall and said soil support member, a liquid outlet extending between said space and exterior of said container, said soil support member having at least one downwardly extending wall to define a cavity, a plurality of apertures having a minimum size of at least 2 mm in said downwardly extending wall, said downwardly extending wall and said apertures extending below said liquid outlet.

10. The container of claim 9 further including a transparent portion in said side wall, said transparent portion having a green colour.

11. The container of claim 9 further including an inert non soil medium in said cavity and a soil on top of said inert non soil medium.

12. In combination, a plant container containing a growing medium and at least one plant therein, said container having a bottom wall and a side wall extending upwardly therefrom, a soil support member spaced from said bottom wall to define a space between the bottom wall and said soil support member, at least one wall extending downwardly from said soil support member to thereby define a cavity, a plurality of apertures in said wall, said apertures having a minimum size of at least 2 mm to permit root growth therethrough, an air inlet to said space, said air inlet communicating with an upper portion of said space, a gas outlet from said space, water within said container below said air inlet and said gas outlet, said growing medium comprising a lower layer of a non soil material within said cavity, said non-soil material having interstices therebetween to permit capillary action, an upper layer of soil, said at least one plant having roots extending through said soil and growing medium and through said apertures to said water.

13. The combination of claim 12 further including a transparent portion in said side wall, said transparent portion being of a green colour.

14. The combination of claim 12 wherein said apertures have a minimum size of at least 6 mm.

15. The combination of claim 12 wherein said apertures formed in said wall extending downwardly from said soil support member have an area comprising at least 50% of the surface area of said wall.

16. The combination of claim 12 wherein said non-soil material is vermiculite.

* * * * *